Sept. 7, 1948.   J. M. TYRNER   2,448,694
ELECTRIC WELDING APPARATUS
Filed April 13, 1946   2 Sheets-Sheet 1
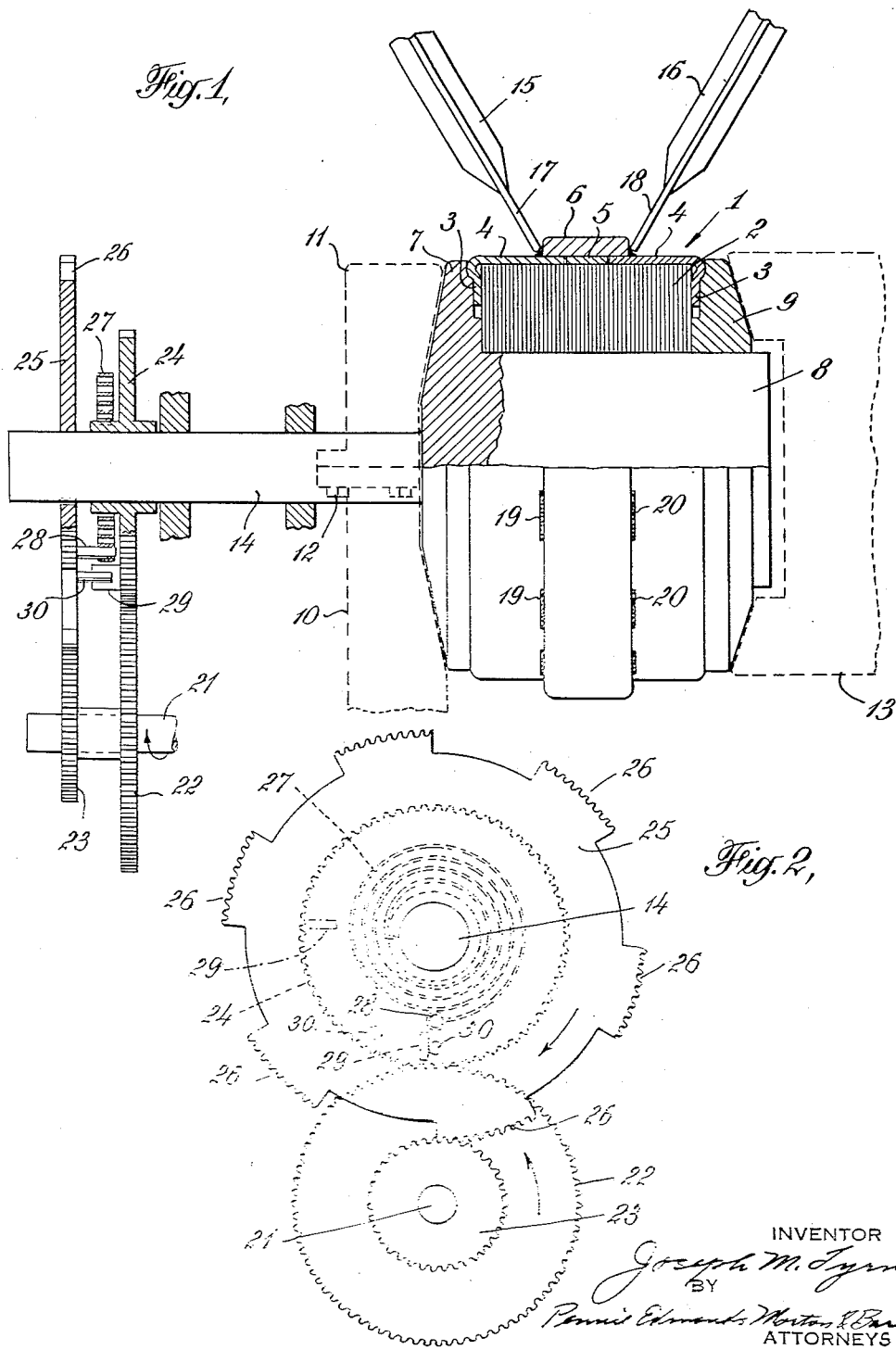

Sept. 7, 1948. J. M. TYRNER 2,448,694
ELECTRIC WELDING APPARATUS
Filed April 13, 1946 2 Sheets-Sheet 2
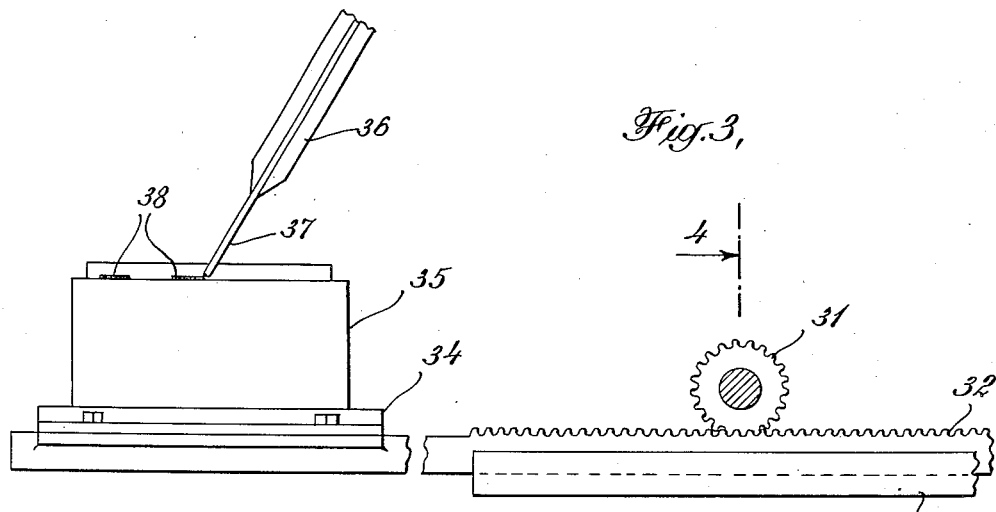
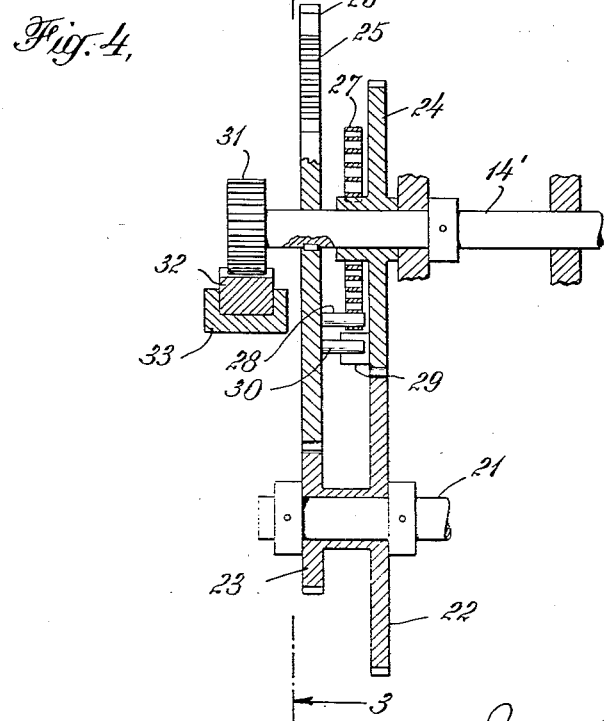
INVENTOR
Joseph M. Tyrner
BY
Pennie Edmonds Morton & Barrows
ATTORNEYS Patented Sept. 7, 1948

2,448,694

UNITED STATES PATENT OFFICE 2,448,694

ELECTRIC WELDING APPARATUS

Joseph M. Tyrner, New York, N. Y., assignor to Air Reduction Company, Incorporated, a corporation of New York Application April 13, 1946, Serial No. 662,033

5 Claims. (Cl. 219—8)

This invention relates to electric welding apparatus, and more particularly to improvements in automatic skip welding apparatus adapted to form one or more straight or curved welded seams, each comprising a series of spaced apart beads deposited by the welding electrode as the work is progressively advanced with respect to the electrode, or electrodes.

A particular object of this invention is to provide welding apparatus including driving means for advancing the work with respect to one or more automatic welding heads whereby the metal is deposited when the work moves with respect to the welding rod, or rods, at a rate slow enough to permit the deposit to form, the work being then rapidly advanced at such a rate that it is not heated to welding temperature, and accordingly during this rapid movement of the work with respect to the welding head, metal is not deposited along the seam.

In general, the objects of my invention are attained by providing a main drive shaft and a skip drive connection between the main drive shaft and the work, the construction and arrangement of the parts being such that a countershaft is driven at varying speeds whereby a series of spaced apart beads are formed as the work is advanced. Thus, my improved welding apparatus may comprise a countershaft connected to the work to move the same with respect to one or more electrodes and a pair of gears or pinions on the main driving shaft arranged to drive gear elements on the countershaft, a gear loosely mounted on the countershaft being driven at constant speed and another gear element fixed to the countershaft being driven at varying speeds, first at a low rate of speed such that the weld deposit forms a bead along the seam to be welded for a predetermined distance, and then at a higher rate of speed to interrupt the deposit of welding metal for another predetermined distance along the seam. This relatively rapid movement of the work with respect to the welding head is then arrested so that the welding electrode may again deposit metal to form the next section of the series of weld beads along the seam.

The rapid movement of the work may be produced by the action of the gear loosely mounted on the countershaft applying tension to a coiled spring connecting this gear with the gear element fixed to the countershaft, this latter gear being formed so that it is periodically released from its driving connection with a pinion on the main drive shaft so that the coiled spring will rapidly advance this gear fixed to the countershaft each time it is released. A pair of complementary abutments or detents carried by the two gear elements on the countershaft may be provided for the purpose of arresting the rapid movement of the gear fixed to the countershaft to thereby facilitate the reengagement of gear teeth on this element with a driving pinion on the main drive shaft whereby the countershaft and the work are again driven at a relatively slow rate of speed to permit the deposit of welding metal along the seam. My improved apparatus may be employed for the purpose of forming a series of weld beads along a straight seam, or it may be employed for the purpose of forming a series of beads along a seam in the form of a circle around the periphery of a work piece rotated with respect to one or more automatic welding heads.

The various objects and advantages of my invention will be more apparent on considering the following detailed description of certain embodiments of this invention illustrated in the accompanying drawings in which:

Fig. 1 is an elevation, partly in section, of one embodiment of my improved welding apparatus illustrating its use in forming a series of weld beads around the periphery of a work piece rotated with respect to a pair of automatic welding heads;

Fig. 2 is an end elevation of the driving apparatus forming a part of the welding apparatus illustrated in Fig. 1;

Fig. 3 is a section view taken on line 3—3 of Fig. 4 illustrating a modified form of the apparatus illustrating its application to the formation of a series of welding beads along a straight seam; and Fig. 4 is a vertical section view taken along line 4—4 of Fig. 3 illustrating details of the modified form of apparatus for forming a series of beads along a straight seam.

For the purpose of illustrating a typical embodiment of my invention, I have illustrated in Fig. 1 a work piece 1 in the form of an assembled stator element of a dynamo electric machine, this stator element including a stack of laminations 2 forming an annular body with a cylindrical periphery, the stack of laminations being held between the end flanges 3 of a pair of retaining members 4 having mating or intermeshed serrated marginal portions as illustrated at 5. A circular band of metal 6 covers these mating portions of the retaining members 4. The body of laminations 2 engaged by the retaining members 4 are held firmly in place by the end flange 7 of a mandril having a core 8 extending through the central opening in the annular body formed by the laminations 2, a clamping plate 9 engaging one end of the work piece. In dotted lines at 10 and 11, I have illustrated diagrammatically a temporary support having sections bolted together as shown at 12, and at 13. I have illustrated diagrammatically in dotted lines the head of a hydraulic press or the like, which is used for the purpose of applying pressure to the stack of laminations 2 and the end flanges 3 of the two retaining members 4. After these elements have been compressed, the supporting plate 9 can be fixed to the mandril core 8 by any suitable means (not illustrated) and then the temporary support comprising the elements 10 and 11 and the press head 13 are removed so that the work piece mounted on the mandril core 8 can be rotated by the shaft 14 connected thereto.

At 15 and 16, I have illustrated automatic welding heads carrying welding rods 17 and 18 mounted in juxtaposition to the joint or seam between the marginal edges of the metal band 6 and the adjacent cylindrical surfaces of the retaining members 4. The details of the construction and operation of the automatic welding heads 15 and 16 form no part of this invention and accordingly they are not illustrated in detail in the drawings.

In the embodiment of my invention illustrated in Figs. 1 and 2, the cylindrical work piece is rotated with respect to the welding heads 15 and 16 at varying speed, the work piece being first rotated slowly so as to permit the welding rods 17 and 18 to deposit metal to form a bead on either side of the metal band 6 as shown at 19 and 20. After a pair of beads 19 and 20 have been formed for a predetermined distance along the seams, the shaft 14 is suddenly rotated at a higher rate of speed to interrupt the welding operation for another predetermined distance of travel of the work piece with respect to the welding heads 15 and 16. The apparatus for producing this varying speed of the work with respect to the welding heads comprises a main driving shaft 21 having a pair of pinions 22 and 23 fixed thereto. The shaft 14 may be regarded as a countershaft driven by the main driving shaft 21 in the manner hereinafter explained.

A gear 24 is loosely mounted on the countershaft 14 and meshes with the gear 22 fixed to the drive shaft 21. A second gear element 25 is fixed to the countershaft 14 and this gear element 25 has a series of toothed gear segments 26 arranged at intervals around its periphery with blank spaces or gaps between these two segments. The series of toothed segments 26 periodically engage the pinion 23 fixed to the main drive shaft 21. It will be noted that the pinion 23 is substantially smaller than the other pinion 22 fixed to the main drive shaft and the gear elements 24 and 25 on the countershaft are of corresponding dimensions to match the size of the driving pinions 22 and 23, the arrangement being such that the pinion 22 drives the gear 24 at a higher rate of speed than the pinion 23 drives the gear element 25 while a toothed segment of the gear element 25 is in engagement with the gear 23. A coiled spring 29 serves to interconnect the two gears on the countershaft 14, one end of the spring being secured to the hub of gear 24 and the other end of the spring being fixed to a pin 28 carried by the gear element 25.

It will be understood that during the operation of the apparatus illustrated in Figs. 1 and 2, the drive pinion 23 while in mesh with a toothed segment 26 on the gear element 25, drives this gear element and the countershaft 24 to which it is fixed at a rate of speed such that the work piece is turned slowly with respect to the automatic welding heads 15 and 16 so that a weld bead is formed along either side of the metal band 6 to join this band to the retaining members 4. At the same time, gear 24 is being driven by the driving pinion 22 at a more rapid rate than the larger gear element 25 is being turned by the action of the driving pinion 23, with the result that the coiled spring 27 is wound up, thus applying a torque tending to drive the large gear element 25 at a faster rate than is permitted by its driving connection with the pinion 23. However, as soon as the toothed segment 26 is disengaged from the driving pinion 23, the spring 27 is free to drive the gear element 25 and the resulting rapid movement of the gear element 25, due to the energy supplied thereto by the gear 24 and the coiled spring 27, serves to advance the work piece so rapidly that the welding rods can no longer deposit metal along the seams or joints between the circular band 6 and the retaining members 4. This rapid relative movement is so great that the metal of the work piece is not heated up to the point where the metal will deposit. In this manner, the welding operation is suddenly interrupted as soon as the gear element 25 is released and suddenly advanced by the action of the coiled spring 27.

This rapid movement continues until a lug or detent 29 on the gear 24 strikes a pin 30 carried by the gear element 25 to arrest the rapid movement of the gear element 25. For a brief interval, the gear element 25 is then advanced in unison with the gear 24 and then the succeeding toothed segment 26 on the gear element 25 meshes with the driving pinion 23, whereupon the gear element 25 is rotated slowly to permit the next pair of beads to be formed along the welding seams of the work piece. During the brief interval when the gears 24 and 25 travel in unison, the work travels at a speed approximately twice the normal welding speed because the gear 24 rotates at a speed approximately twice that of the gear element 25 when this gear element is being driven by the pinion 23. The blank spaces between the toothed gear segments 26 on the gear element 25 are slightly longer than the toothed segments. This insures engagement of the detents or abutments 29 and 30 before the teeth on the next succeeding segment 26 engage the teeth on the pinion 23, thus preventing injury to the gear teeth and insuring proper meshing of the gear teeth when contact is made with the pinion 23.

In Figs. 3 and 4, I have illustrated a typical embodiment of my invention as applied to the formation of a skip weld along a straight seam as distinguished from the formation of a skip weld around the periphery of a body rotated with respect to the welding heads. In Figs. 3 and 4, many of the elements are the same as the corresponding elements in Figs. 1 and 2 and bear the same reference characters. In Figs. 3 and 4, however, the countershaft shown at 14' carries a pinion 31 engaging a rack 32 mounted in a suitable slide support 33, the rack being connected to a bed plate 34 adapted to support a work piece 35. In Figs. 3 and 4, it will be understood that the mechanism provides a skip drive connection between the main drive shaft 21 and the countershaft 14' so that the pinion 31 is driven at varying speeds to produce corresponding relative movement between the work 35 and an automatic welding head 36 which holds the welding rod 37 in proper position opposite the seam to be welded. The operation of the apparatus in Figs. 3 and 4 is such that a series of weld beads 38 is formed along the work piece, the skip weld mechanism operating to interrupt the deposit of metal at regular intervals as described above in connection with the apparatus illustrated in Figs. 1 and 2.

My invention is not limited to the particular embodiments illustrated in some detail in the accompanying drawings but includes such modifications thereof as fall within the scope of the appended claims.

I claim:

1. Welding apparatus of the type described comprising means for holding a welding electrode in juxtaposition to the work, means for producing relative motion between the work and the electrode, and variable speed driving means for producing said relative motion comprising a constant speed drive shaft, a countershaft connected to the work, a pair of gears fixed to said drive shaft, a second pair of gears carried by said countershaft, one of said second pair of gears being fixed to the countershaft and the other being loosely mounted thereon, and a spring interconnecting the gears on the countershaft, the said gear fixed to the countershaft having blank spaces at intervals around the periphery thereof whereby this gear is alternately driven by a gear on the drive shaft at a speed corresponding with normal welding speed, and then at a higher speed by the action of the other gear on the countershaft and the said spring.

2. Welding apparatus of the type described, comprising means for holding a welding electrode in juxtaposition to the work, means for producing relative motion between the work and the electrode, and variable speed driving means for producing said relative motion comprising a constant speed drive shaft, a countershaft connected to rotate the work, a pair of gears fixed to said drive shaft, a second pair of gears carried by said countershaft, one of said second pair of gears being fixed to the countershaft and the other being loosely mounted thereon and a spring interconnecting the gears on the countershaft, the said gear fixed to the countershaft having blank spaces at intervals around the periphery thereof whereby this gear is alternately driven by a gear on the drive shaft at a speed corresponding with the normal welding speed and then at a higher speed by the action of the other countershaft gear and said spring.

3. Welding apparatus of the type described, comprising means for holding a welding electrode in juxtaposition to the work, means for producing relative motion between the work and the electrode, and variable speed drive means for producing said relative motion comprising a constant speed drive shaft, a countershaft, a pinion and rack actuated by said countershaft to move the work with respect to the welding electrode, a pair of gears fixed to said drive shaft, a second pair of gears carried by said countershaft, one of said second pair of gears being fixed to the countershaft and the other being loosely mounted thereon, and a spring interconnecting the gears on the countershaft, the said gear fixed to the countershaft having blank spaces at intervals around the periphery thereof whereby this gear is alternately driven at a speed corresponding with normal welding speed, and then at a higher speed by the action of the other countershaft gear and the said spring.

4. Welding apparatus of the type described comprising means for holding a welding electrode in juxtaposition to the work, means for producing relative motion between the work and the electrode, and variable speed driving means for producing said relative motion comprising a constant speed drive shaft, a countershaft connected to the work, a pair of gears fixed to said drive shaft, a second pair of gears carried by said countershaft, one of said second pair of gears being fixed to the countershaft and the other being loosely mounted thereon, and a spring interconnecting the gears on the countershaft, the said gear fixed to the countershaft having blank spaces at intervals around the periphery thereof whereby this gear is alternately driven by a gear on the drive shaft at a speed corresponding with normal welding speed, and then at a higher speed by the action of the other gear on the countershaft and the said spring, and the gear ratio of the gears on the drive shaft and on the countershaft being such that while the gear fixed to the countershaft is driven by a gear on the drive shaft at a speed corresponding to the normal welding speed, the other gear on the countershaft is driven by the other drive shaft gear at a speed higher than that of the gear fixed to the countershaft.

5. Welding apparatus of the type described comprising means for holding a welding electrode in juxtaposition to the work, means for producing relative motion between the work and the electrode, and variable speed driving means for producing said relative motion comprising a constant speed drive shaft, a countershaft connected to the work, a pair of gears fixed to said drive shaft, a second pair of gears carried by said countershaft, one of said second pair of gears being fixed to the countershaft and the other being loosely mounted thereon, and a spring interconnecting the gears on the countershaft, the said gear fixed to the countershaft having blank spaces at intervals around the periphery thereof whereby this gear is alternately driven by a gear on the drive shaft at a speed corresponding with normal welding speed, and then at a higher speed by the action of the other gear on the countershaft and the said spring, the countershaft gears having means associated therewith for arresting the rapid movement of the gear fixed to the countershaft before this gear is again engaged by a gear on the drive shaft.

JOSEPH M. TYRNER.

REFERENCES CITED

The following references are of record in the file of this patent:

UNITED STATES PATENTS

| Number | Name | Date |
| --- | --- | --- |
| 1,590,314 | Probert et al. | June 29, 1926 |
| 1,831,343 | Caldwell | Nov. 10, 1931 |